United States Patent [19]

Rappinger et al.

[11] Patent Number: 4,541,099
[45] Date of Patent: Sep. 10, 1985

[54] DC ARC FURNACE IMPROVED HEARTH CONSTRUCTION

[75] Inventors: Bo Rappinger; Sven-Einar Stenkvist, both of Västerås, Sweden

[73] Assignee: ASEA Aktiebolag, Västerås, Sweden

[21] Appl. No.: 275,377

[22] Filed: Apr. 17, 1984

[30] Foreign Application Priority Data

Apr. 21, 1983 [SE] Sweden .................................. 8302248
Oct. 17, 1983 [SE] Sweden .................................. 8305683

[51] Int. Cl.³ .............................................. H05B 7/00
[52] U.S. Cl. ...................................... 373/72; 373/108
[58] Field of Search ..................... 373/71, 72, 75, 107, 373/108

[56] References Cited

U.S. PATENT DOCUMENTS

| | | | |
|---|---|---|---|
| 1,287,849 | 12/1918 | Booth | 373/72 |
| 1,674,982 | 6/1928 | Moore | 373/72 |
| 4,228,314 | 10/1980 | Stenkvist | 373/72 |
| 4,277,638 | 7/1981 | Stenkvist | 373/72 |
| 4,324,943 | 4/1982 | Stenkvist et al. | 373/108 |
| 4,428,731 | 1/1985 | Maes et al. | 373/72 |
| 4,468,782 | 8/1984 | Stenkvist | 373/108 |

Primary Examiner—A. D. Pellinen
Assistant Examiner—Gregory D. Thompson
Attorney, Agent, or Firm—Kenyon & Kenyon

[57] ABSTRACT

A DC arc furnace has an electrically conductive hearth adapted to contain a melt, and at least one arcing electrode above the hearth and adapted to form a heating arc with the melt when the hearth and electrode are supplied with DC power. The hearth has a wear lining directly contacted by the melt through which electrical conductors extend from the bottom of the wear lining to its top. Layers of electrically conductive bricks are under the wear lining and have a top layer electrically connecting with the electrical conductors, and a melt plate under the layers of the electrically conductive bricks is connected to DC power. The layers of conductive bricks have a bottom layer in electrical connection with the melt plate. The improvement comprises a layer of mixed bricks between the top and bottom layers of the electrically conductive bricks and formed by alternating electrically conductive and non-conductive bricks.

6 Claims, 3 Drawing Figures

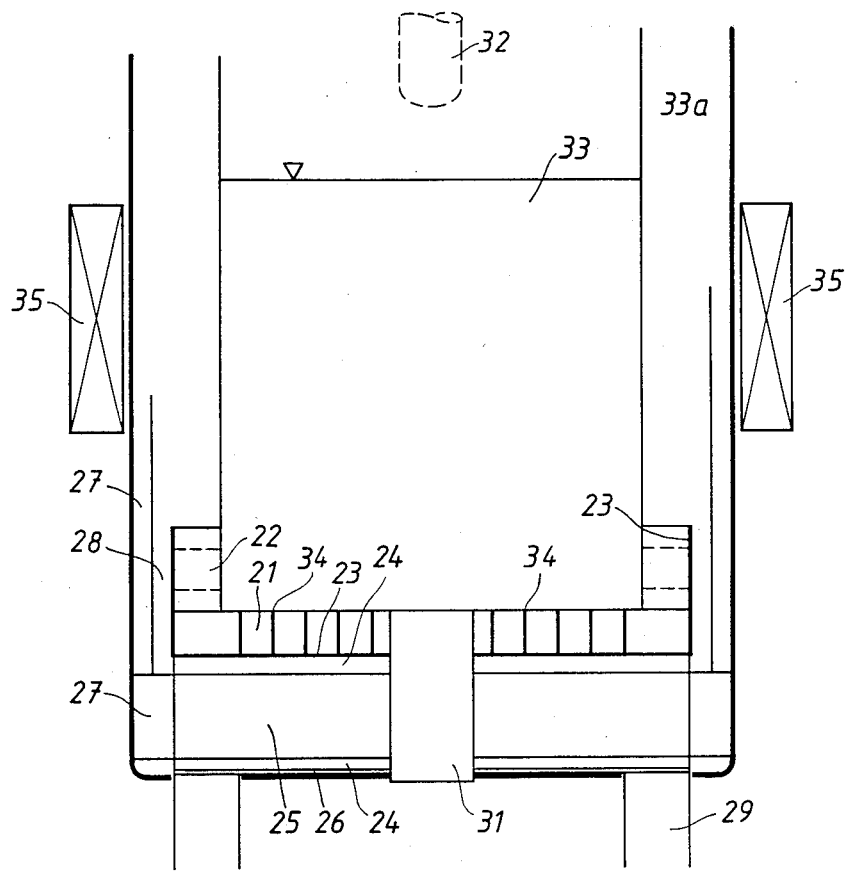

DC ARC FURNACE IMPROVED HEARTH CONSTRUCTION

BACKGROUND OF THE INVENTION

DC arc furnaces having electrically conductive hearths are disclosed by U.S. Pat. Nos. 4,228,314 and 4,324,943.

The hearth of such a furnace is adapted to contain a melt of molten metal, the furnace having at least one arcing electrode with a tip positioned above the hearth and adapted to form a heating arc with the melt when the electrode and hearth are supplied with DC power.

In the patents, the hearth comprises a wear lining directly contacted by the melt and formed by refractory material through which electrical conductors extend from the bottom of the wear lining to the top for contact with the melt. Superimposed layers of electrically conductive bricks are laid beneath the wear lining and connect the bottom portions of the conductors with a metal conductor plate below and in electrical connection with the bottom layer of the electrically conductive bricks. The metal plate is adapted to be connected with the DC power circuit including the arcing electrode.

In U.S. Pat. No. 4,228,314 the refractory material through which the electrical conductors extend is formed by a refractory compound rammed on the conductive bricks with the conductors formed by metal rods extended through the compound. In U.S. Pat. No. 4,324,943 the refractory compound is formed by bricks through which the electrical conductors extend, or metal encased bricks may be used.

The electrical conductors used with either of the refractory materials, rammed compound or bricks, the electrically conductive bricks and the metal plate, are not only good electrical conductors as required for the arc's power circuit but are also correspondingly good thermal conductors. Consequently the heat of the melt heated by the arc is to a high degree transmitted to the metal plate. This can result in excessive heating of the metal plate and therefore the furnace bottom.

SUMMARY OF THE INVENTION

According to the present invention, the layers of the electrically conductive bricks beneath the wear lining have an interposed layer in part of bricks of high electrical and thermal conductivity and in part of bricks of low electrical and therefore low thermal conductivity, the bricks being mixed and laid together to form the layer. The two kinds of bricks are laid to provide a spread distribution of the electrically conductive bricks interposed by the bricks of low conductivity. The distribution of bricks in the layer is such as to provide adequate electrical conductivity between the conductive brick layers but with the thermal conductivity substantially decreased by the presence of the bricks of low conductivity. This results in a substantial reduction in the temperature of the metal plate when the furnace is in operation.

One or more layer of the bricks all of high conductivity are laid between the top of the above described layer of bricks of alternating high and low conductivity, and the wear lining of the hearth, and between the bottom of this special layer of bricks and the metal plate. This has the advantage of more uniformly distributing the electrical and thermal conductivity between the electrically conductive bricks of the special layer, preventing localized areas of high current and heat concentration.

DESCRIPTION OF THE DRAWINGS

The invention is explained in more detail below with the aid of the accompanying drawings in which:

FIG. 3 is a schematic vertical section of a ladle arc furnace embodying the invention.

DETAILED DESCRIPTION OF THE PREFERRED EMBODIMENT

Figure 1:
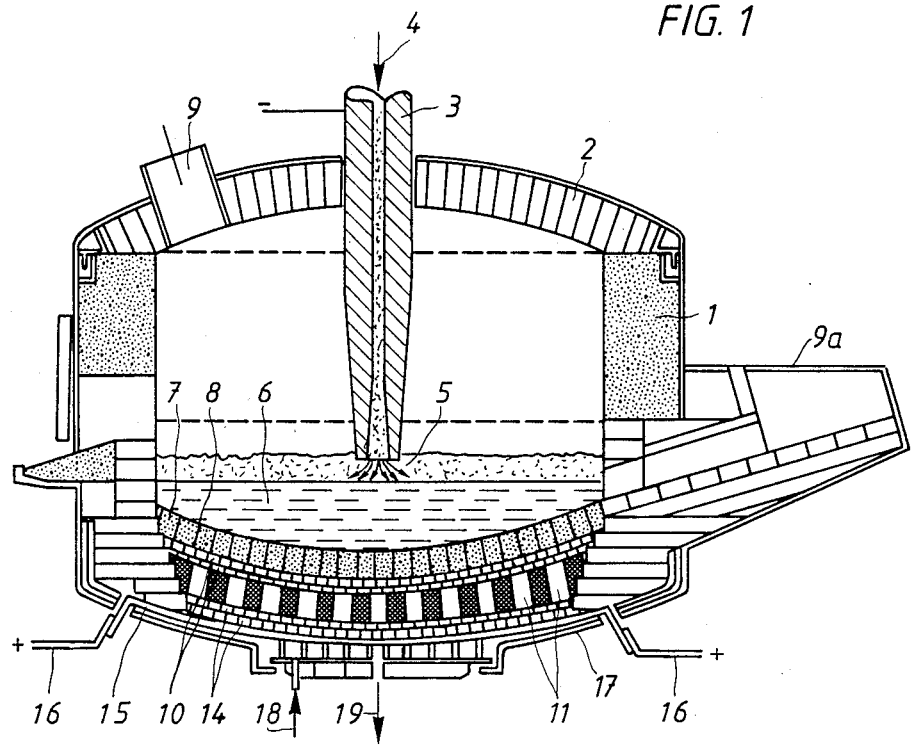
FIG. 1 is a vertical section of an arc furnace of the rocking type embodying the invention.

The arc furnace shown by FIG. 1 has a cylindrical side wall 1, and a domed roof 2 through which a consumable electrode 3 depends. In this case the electrode is tubular so that metal oxide can be fed through it as indicated at 4, permitting the furnace to be used for the direct melt reduction of metal oxide. The furnace can also be used as a melting furnace in which case a solid electrode would be used. When the furnace is working a heating arc 5 is formed between the tip of the electrode and a melt 6 of molten metal in the furnace hearth below the electrode.

The wear lining 7 of the hearth, directly contacted by the melt, may be as disclosed by the previously mentioned two patents, consisting either of a rammed refractory or refractory bricks, with electrical conductors 8 extending from the bottom of the wear lining to its top.

The roof 2 has a gas exhaust outlet 9 and the side wall 1 and hearth have a pouring spout 9a, through which the melt can be tapped by rocking the furnace.

As in the mentioned patents the wear lining 7 is supported by one or more layers of electrically conductive bricks 10 such as carbon bricks, graphite bricks etc. Possibly a layer of graphite may be used between the bottom of the wear lining and the carbon bricks. In any event the bottom ends of the electrical conductors 8 should be in good electrical connection with the top layer of the electrically conductive bricks.

Figure 2:
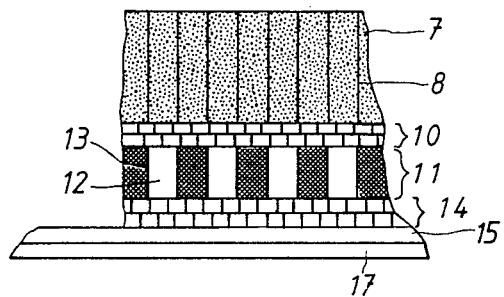
FIG. 2 is a vertical section on an enlarged scale of a segment of the hearth.

Contrasting with the patented constructions, the upper layers of electrically conductive bricks 10 supported by a layer 11 of mixed bricks consisting in part of electrically conductive bricks and in part of electrically non-conductive bricks. These bricks can be specially sized to make the layer 11 of substantial height or thickness. In FIGS. 1 and 2 the electrical non-conductive bricks are shown at 12 and the conducting bricks at 13, the latter being cross-hatched to indicate the difference.

This layer 11 of mixed bricks is in its turn supported by layers 14 of electrically conductive bricks resting on the metal plate 15 having the oppositely extending electrical connections or terminals 16 through which the DC arcing power supply is connected, the other power connection, of course, being to the electrode 3. With suitable intervening electrical insulation there is the bottom part 17 of the steel furnace shell. The central portion of the metal plate 15 is provided with air cooling, air being injected at 18 and exhausted at 19.

Furnaces constructed according to the mentioned patents have the above cooling but it has not been found to be adequate to always keep the bottom of the furnace from becoming undesirably hot. In these furnaces the layers of electrically conductive bricks, shown here at 10 and 14, are joined together as a vertical intercontacting of uninterrupted layers of electrically conductive bricks. Heat from the melt 6 can be conducted directly via the electrical conductors of the wear lining and the electrically conductive bricks to the metal plate beneath the conductive brick layers. Anything that is electrically conductive is inherently a good thermal conductor. Consequently the metal plate 15 and the bottom of the furnace shell 17 can become undesirably hot during operation of the furnaces.

The hearth wear lining refractory material may be either a rammed granular non-conductive refractory or non-conductive refractory bricks, the electrical conductors being metal bars, plate-like elements etc. Metal encased refractory bricks might be used. Any kind of electrical conductor elements used to make the wear lining electrically conductive are necessarily good thermal conductors.

The conducting bricks of the layers 10 and 14 can be magnesite-graphite, carbon or graphite bricks etc.

In the layer 11 the electrically and thermally insulating bricks 12 may be for example of the chamotte, dolomite, magnesite or chrome-magnesite types. The electrically conductive bricks 13 may be for example of the magnesite-graphite, carbon or pure graphite types. In FIG. 1 and 2 the layer 11 of mixed bricks is shown with bricks of the two types alternating throughout the layer 11 so that the layer in part is 50% conductive bricks, the non-conductive bricks being chamotte or other suitable oxide material. If the conductive bricks are pure graphite bricks which are much more electrically and thermally conductive than other conductive brick types, the amount with which they are used must be substantially reduced such as to about from 2 to 10% of the mixed brick construction.

In any event the distribution of the conductive bricks should provide a substantially uniform distribution of the DC throughout the lateral extent of the mixed bricks. The tops and bottoms of the electrically conductive bricks are electrically interconnected by the layers 10 and 14 of electrically conductive bricks so that the interspaced electrically conductive bricks 13 carry the current in parallel. The percentage of conductive bricks used should be adequate to satisfactorily carry the current required by the arc.

In FIG. 3 a ladle furnace is schematically indicated. A ladle furnace is used to receive a melt possibly tapped from the furnace of FIG. 1 when it is used as a melting furnace. In the ladle the melt is refined and possibly brought to final analysis for casting. To maintain the heat of the melt in the ladle an arcing electrode is used and to promote uniformity it may be desirable to electromagnetically stir the melt.

With the above in mind the ladle furnace shown by FIG. 3 is designed to embody the basic principles of the present invention.

In FIG. 3 the DC arcing electrode 32 is above a melt 33 supported in the ladle by a hearth having a wear lining 21 which in this case is extended upwardly at 22 but for only a small part of the height of the ladle's wall 33a. This wear lining can comprise a steel plate shell 23 in the form of a cup having steel pins 34 welded to it and extending inwardly with non-conductive refractory material rammed around the pins to form the wear lining as a unit. This wear lining can be made outside of the ladle and installed in the ladle at an appropriate time during the ladle internal construction or repair.

When installed the wear lining unit rests on the electrically conductive brick layers 24 with the layer of mixed bricks 25 previously described, interposed between the layers 24, the electrically conductive plate 26 being shown below the bottom layer of conductive bricks 24 with its DC power connection 29 extending downwardly.

Behind the upstanding portion of the steel shell 23 of the wear lining unit there can be installed an electrically and thermally insulating layer 27-28 of dry rammed magnesite compound or the like, and behind this there can be an electrically and thermally insulating layer of chamotte or the like.

The ladle can have the usual valve-controled bottom pouring equipment, the location being indicated at 31.

The bottom portion of the ladle can be laid-up with the layers 24-25 and the metal plate 26 adequately insulated, all in place. Then the wear lining unit comprising the steel shell 23 and its refractory material 21 installed around the metal pins 34, as a prefabricated unit, can then be lowered into the ladle, after which the balance of the ladle lining can be made in the usual fashion.

Because the wear lining unit does not have its steel supporting and other electrical part extending upwardly for more than a fraction of the height of the ladle wall, the stirring flux from electromagnetic stirrers 35 positioned outside of the ladle wall at a normalle acceptable height with respect to the ladle, is not impeded by the new hearth construction.

What is claimed is:

1. A DC arc furnace having an electrically conductive hearth adapted to contain a melt, at least one arcing electrode above the hearth and adapted to form a heating arc with the melt when the hearth and electrode are supplied with DC power; the hearth having a wear lining directly contacted by the melt and formed by refractory material through which electrical conductors extend from the bottom of the wear lining to its top, layers of electrically conductive bricks under the wear lining and having a top layer electrically connecting with the electrical conductors, and a metal plate under the layers of electrically conductive bricks and adapted to be connected with the DC power, the layers of conductive bricks having a bottom layer in electrical connection with the metal plate; wherein the improvement comprises a layer of mixed bricks between the top and bottom layers of the electrically conductive bricks and formed in part by electrically conductive bricks and in part by electrically non-conductive bricks.

2. The furnace of claim 1 in which the layer of mixed bricks include only enough electrically conductive bricks to conduct the DC power between the top and bottom layers of electrically conductive bricks and are distributed throughout the layer of mixed bricks so as to provide a substantially uniform distribution of DC throughout the lateral extent of the layer of mixed bricks.

3. The furnace of claim 2 in which the electrically non-conductive bricks are of low thermal conductivity.

4. The furnace of claim 1 in which a sheet metal part is interposed between the bottom of the wear lining and the top layer of the layers of conductive bricks, and the electrical conductors which extend through the wear lining are metal with bottom portions welded to the sheet metal part.

5. The furnace of claim 4 in which the sheet metal part is in the form of a cup having a side wall and the wear lining is a rammed refractory.

6. The furnace of claim 5 in which the furnace has a furnace side wall up which the cup's side wall extends only partially so as to leave an upwardly extending portion of the furnace side wall free from the cup's side wall, and electromagnetic melt stirrers positioned on the outside of the furnace side wall's upwardly extending portion.

* * * * *